United States Patent
Meyer

(10) Patent No.: US 6,533,515 B2
(45) Date of Patent: Mar. 18, 2003

(54) FASTENER HAVING MOVABLE DRIVE PIN

(75) Inventor: Charles P. Meyer, New Lenox, IL (US)

(73) Assignee: Illinois Tool Works, Glenview, IL (US)

( * ) Notice: Subject to any disclaimer, the term of this patent is extended or adjusted under 35 U.S.C. 154(b) by 0 days.

(21) Appl. No.: 09/907,321

(22) Filed: Jul. 17, 2001

(65) Prior Publication Data

US 2003/0017022 A1 Jan. 23, 2003

(51) Int. Cl.[7] .............................................. F16B 13/06
(52) U.S. Cl. ............................ 411/45; 411/41; 24/453
(58) Field of Search ........................... 411/41, 45–48; 24/453, 296, 606, 607

(56) References Cited

U.S. PATENT DOCUMENTS

| | | | |
|---|---|---|---|
| 3,918,130 A | * 11/1975 | Poe | |
| 4,276,806 A | 7/1981 | Morel | 411/41 |
| 4,312,614 A | 1/1982 | Palmer et al. | 411/44 |
| 4,571,134 A | 2/1986 | Beglinger et al. | 411/41 |
| 4,674,930 A | 6/1987 | Poe et al. | 411/40 |
| 4,927,287 A | * 5/1990 | Ohkawa | |
| 5,163,795 A | 11/1992 | Benoit et al. | 411/45 |
| 5,201,623 A | 4/1993 | Benedetti et al. | 411/48 |
| 5,286,152 A | 2/1994 | Anderson | 411/45 |
| 5,301,396 A | 4/1994 | Benoit | 24/453 |
| 5,370,484 A | 12/1994 | Murikawa et al. | 411/48 |
| 5,375,954 A | 12/1994 | Eguchi | 411/48 |
| 5,567,098 A | * 10/1996 | Gordon | |
| 5,592,719 A | 1/1997 | Eto et al. | 24/453 |
| 5,704,753 A | 1/1998 | Ueno | 411/509 |
| 5,775,860 A | * 7/1998 | Meyer | |
| 6,074,144 A | * 6/2000 | Meyer | |
| 6,176,660 B1 | * 1/2001 | Lewis | |

FOREIGN PATENT DOCUMENTS

| | | |
|---|---|---|
| DE | 199 50 745 A1 | * 11/2000 |
| DE | 199 50 746 A1 | * 12/2000 |

* cited by examiner

Primary Examiner—Flemming Saether
(74) Attorney, Agent, or Firm—John W. Harbst

(57) ABSTRACT

A fastener including a body and a looking pin is disclosed. The fastener body includes an apertured base and conjoined flexible arms extending from the base and defining a passage therebetween. The locking pin is arranged for movement relative to the fastener body along a predetermined path of travel and within the aperture and the passage defined by the flexible arms. The locking pin has a predriven position and an extended driven position. A resilient lock is provided in conjunction with the fastener body and resiliently extends into the predetermined path of travel of the pin, when said locking or drive pin is in the predriven position, thereby inhibiting movement of said locking pin toward said driven position. The lock remains in position to inhibit inadvertent linear shifting of the driving pin until the flexible arms are inserted through an opening in an article with which the fastener is arranged in operable association. When the flexible arms of the fastener are passed through the opening in the article, the lock is automatically deflected and removed from the path of travel of and permits the locking pin to be moved toward the driven position.

19 Claims, 3 Drawing Sheets

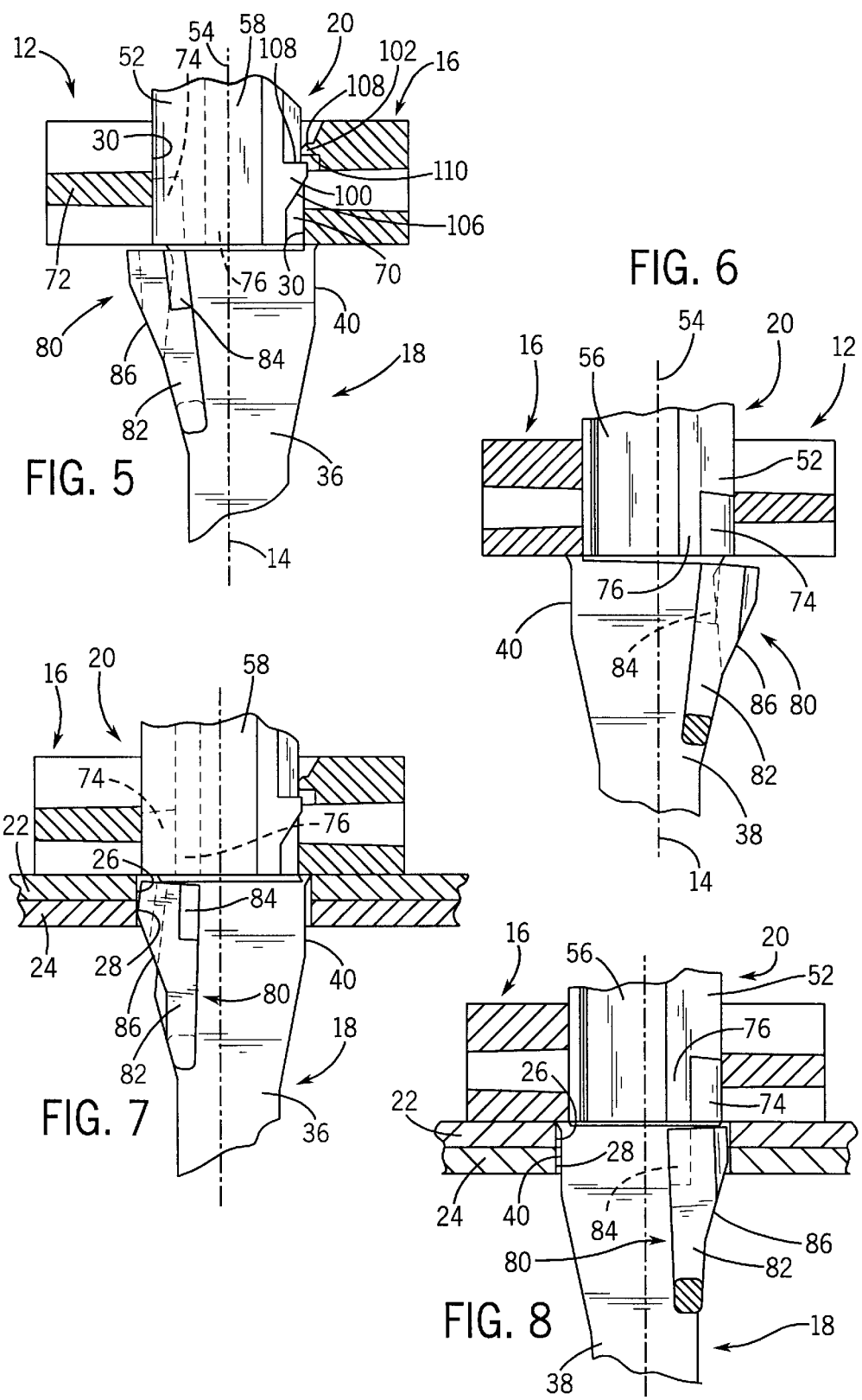

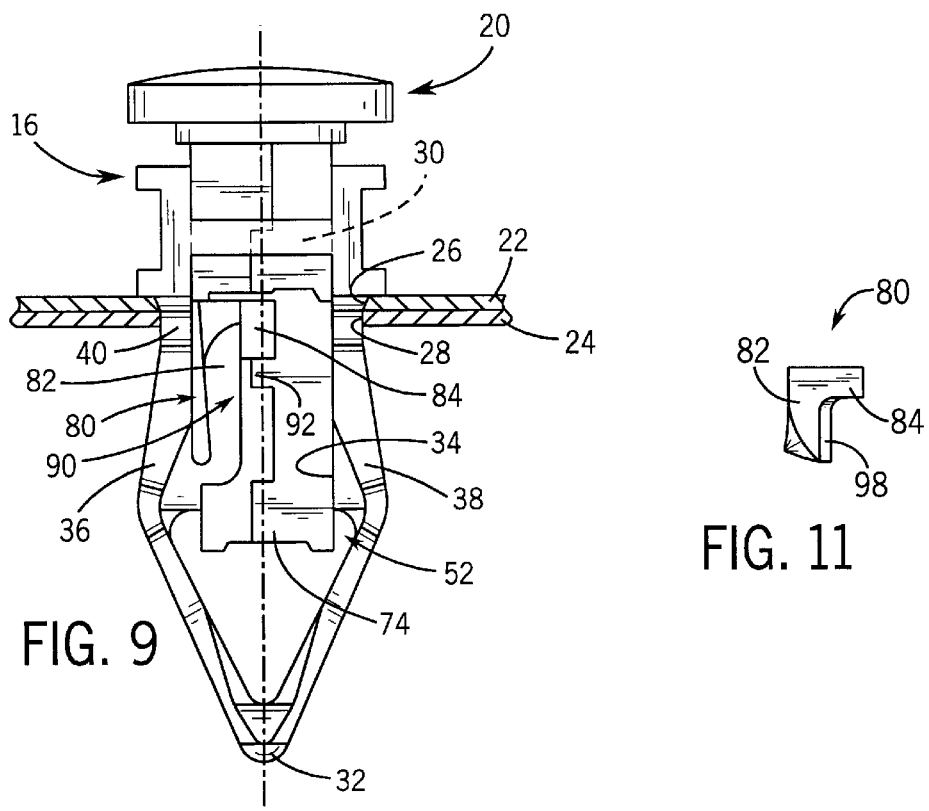
FIG. 9
FIG. 11
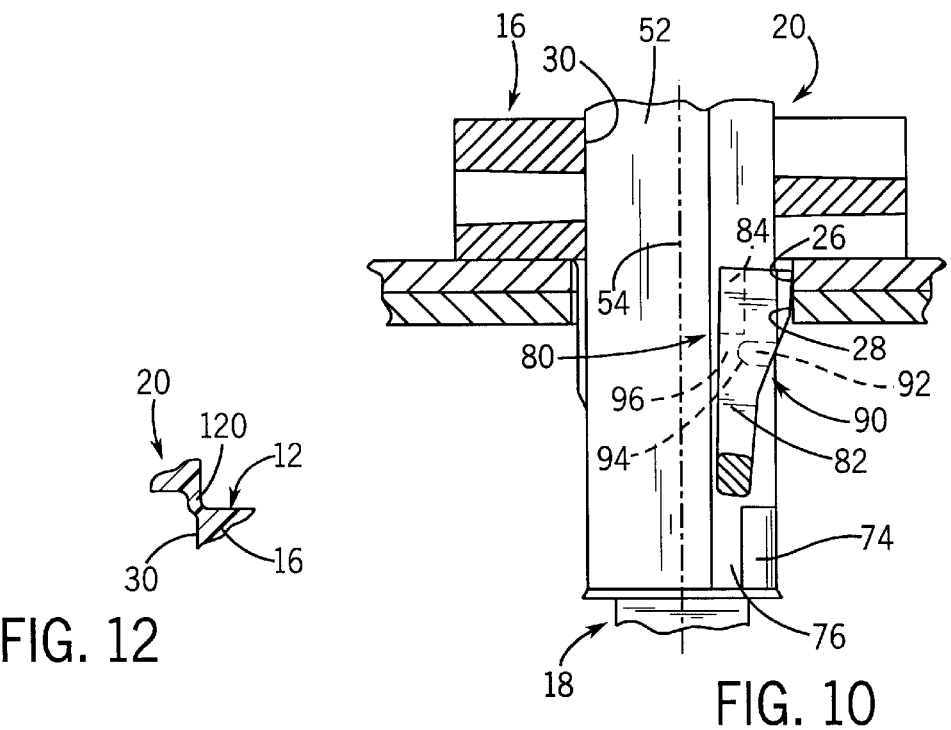
FIG. 12
FIG. 10 under capstan FASTENER HAVING MOVABLE DRIVE PIN

FIELD OF THE INVENTION

The present invention generally relates to fasteners insertable into an opening in an article and, more particularly, to a fastener having a body including a base and a flexible elongated portion which is insertable through the opening in the article, with a drive pin of the fastener being movable into operable association with the flexible elongated portion to maintain the fastener in fixed relation relative to the article.

BACKGROUND OF THE INVENTION

Fasteners are typically utilized to secure two articles together, such as two panels or the like, and include a body and a drive pin. The body of the fastener includes a base and an elongated portion which is insertable through an opening in the article to be secured. The elongated portion of the fastener typically includes flexible arms which extend from the body and define a passage therebetween. After the arms of the elongated portion of the fastener are inserted through the openings in the article to be secured, the drive pin is moved through the passage and between the arms to a driven position wherein the elongated portion of the fastener is expanded and cannot collapse upon itself even if a removal force is applied to the drive pin. As will be appreciated, the expansion of the elongated portion of the fastener opposes removal of the fastener from the holes and thereby secures the panels to each other. Of course, it is desirable to secure the drive pin in a driven position under a relative high retention force.

The drive pins for such fasteners have been known to be predriven into the fastener body and to be frictionally retained therein prior to installation of the fastener into the opening in the article. During shipping and handling of the fasteners, however, the drive pins either become separated from the body of the fastener or inadvertently move to a driven position whereat the drive pin is moved between the flexible arms on the elongated portion of the fastener. As will be appreciated, neither separation of the drive pin from the fastener body nor inadvertent movement of the drive pin to the driven position is acceptable. Moreover, and as will be appreciated by those skilled in the art, low pin insertion forces, such as less than ten pounds, are advantageous for ergonomic reasons. Accordingly, simply increasing the holding force between the drive pin and the body of the fastener to overcome separation therebetween or inadvertent movement of the drive pin is also unacceptable because of the attendant increase in the pin insertion force required to move the pin from the predriven position to a driven position.

Prior art fasteners which require a twisting motion during installation are ergonomically unsound. Moreover, threaded fasteners require expensive and sometimes hazardous installation tools.

Thus, there is a need and continuing desire for a fastener wherein the drive pin is maintained in a predriven position while maintaining a relative low pin insertion force for the drive pin and while concurrently imparting a relative high retention force on the drive pin after the drive pin is moved to a driven position.

SUMMARY OF THE INVENTION

In view of the above, and in accordance with the present invention there is provided a fastener including a body and drive or locking pin. The fastener body includes an apertured base and conjoined flexible arms extending from the base and defining a passage therebetween. At a proximal end thereof, the conjoined arms define an outer surface of a predetermined size. The drive or locking pin defines a longitudinal axis and is arranged for movement relative to said body along a predetermined path of travel and within the aperture and the passage defined by the flexible arms. The locking pin has a predriven position and a driven position. In the driven position a lengthwise portion of the pin extends into the passage between the flexible arms to limit movement of the arms inwardly toward the axis of the drive pin. In a preferred embodiment, the drive or locking pin and the body of the fastener are initially formed as a single piece of molded plastic or the like.

A salient feature of the present invention relates to the provision of a resilient lock provided on the fastener body. When the drive pin is in the predriven position, the lock projects into the predetermined path of travel of the pin thereby inhibiting movement of the locking pin toward said driven position. The lock remains in position to inhibit inadvertent linear shifting of the driving pin until the fastener is inserted through an opening in the article with which the fastener is arranged in operable association. In response to the flexible arms of the fastener passing through the opening in the article, the lock is automatically and resiliently deflected from the path of travel of and permits the locking pin to move toward the driven position.

The opening in the fastener body through which the fastener traverses is preferably configured to generally correspond to the cross-section of the drive pin. As such, the drive pin is inhibited from twisting or rotating about its axis and relative to the fastener body as the drive pin is pushed between predriven and driven positions.

In one form, the lock for releasably maintaining the drive pin in a predriven position relative to the fastener body includes a resilient free ended arm connected at one end to the fastener body and extending toward the fastener body base. The drive or locking pin is configured, toward a lower end thereof, with a channel or recess for accommodating the deflected free ended arm to an extent allowing the locking pin to move past the lock and move to the driven position. Preferably, the free end of the lock or arm is configured to promote movement of said locking pin therepast and toward the driven position after the resilient lock is deflected.

In a preferred form, the fastener is configured such that the drive or locking pin is maintained in the driven position with a relatively high retention force. Preferably, the locking pin is provided with a stop linearly spaced from that end of the locking pin inserted into the aperture in the base of the fastener body. Moreover, the resilient arm on the lock is configured with a tab or projection which engages the stop on said locking pin, after the locking pin moves to the driven position, to retain the locking pin in the driven position with a relatively high retention force.

Preferably, the fastener is configured such that the predriven pin is inhibited from being inadvertently or otherwise pulled from the fastener body during shipping or handling of the fastener. In one form, the locking pin includes a predrive retention protrusion extending from the locking pin and engagable with predrive retention structure on the fastener body base to retain the locking pin in the predriven position and to inhibit the predriven locking pin from being inadvertently pulled or otherwise separated from the fastener body during shipping or handling.

Accordingly, a primary object of the present invention is to provide a fastener which is adapted to be arranged in operable combination with an article defining an opening through which at least a portion of said fastener extends, and wherein a relatively low insertion force is required for installation.

Another object of the present invention is to provide a fastener which is adapted to be arranged in operable combination with an article defining an opening through which at least a portion of said fastener extends, and wherein a relatively low insertion force is required to move a drive pin into operable association with an elongated flexible portion of the fastener.

Another object of the present invention is to provide a fastener with high retention forces subsequent to installation.

Yet another object of this invention is to provide a fastener which inhibits inadvertent shifting of a drive pin from a predriven position to a driven position during shipping and handling of the fastener.

Still another object of this invention is to provide a fastener in which a driven pin is retained within the body of the fastener with a relatively high retention force.

A further object of the present invention is provide a fastener in which a predriven pin is inhibited from inadvertently being pulled or otherwise separated from the body of the fastener with a relatively high retention force.

A still further object of the present invention is to provide a fastener which eliminates any twisting or turning movements required for installation.

Another object of the present invention is to provide a fastener which has relatively low manufacturing costs.

These and other aims, objects and advantages of the present invention will be further appreciated and more fully understood from the following detailed description, detail drawings, and the appended claims.

DESCRIPTION OF THE DRAWINGS

FIG. 5 is an enlarged fragmentary partially sectional view taken along line 5—5 of FIG. 3;

FIG. 6 is an enlarged fragmentary partially sectional view taken along line 6—6 of FIG. 1;

FIG. 7 is an enlarged fragmentary partially sectioned view similar to FIG. 5 but showing the fastener after being inserted within the apertured panels;

FIG. 8 is an enlarged fragmentary partially sectioned view similar to FIG. 6 but showing th, fastener after being inserted within the apertured panels;

FIG. 9 is an enlarged elevational view similar to FIG. 1 but showing the fastener after being inserted within the apertured panels and having the drive pin moved top a driven position;

FIG. 10 is an enlarged fragmentary partially sectioned view similar to FIG. 8 but showing the drive pin for the fastener moved to a driven position;

FIG. 11 is a plan view of a lock forming part of the fastener of the present invention; and FIG. 12 is an enlarged fragmentary sectional view of a frangible portion of the fastener in that embodiment wherein a fastener body and drive pin are integrally molded as a one-piece product.

DESCRIPTION OF THE INVENTION

Figure 1:
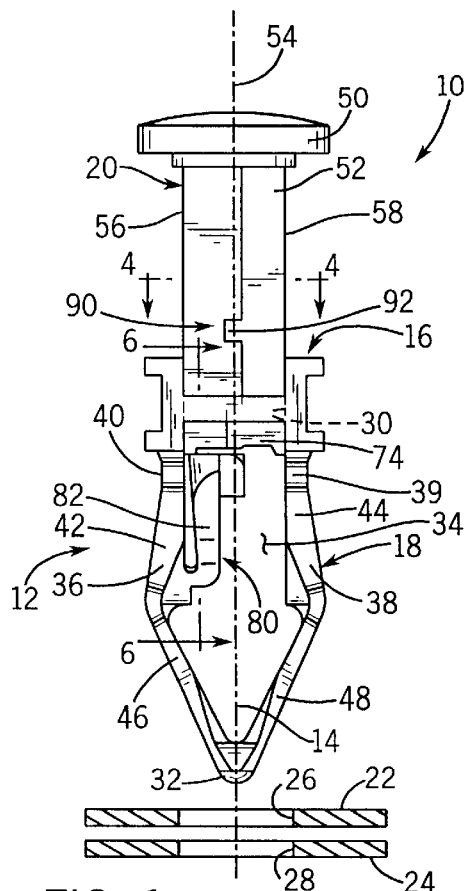
FIG. 1 is an enlarged elevational view showing a fastener according to the present invention, with a drive pin of the fastener in a predriven state or condition and prior to insertion within apertured panels.

While the present invention is susceptible of embodiment in various forms, there is shown in the drawings and will hereinafter be described a preferred embodiment of the invention with the understanding the present disclosure is to be considered as setting forth an exemplification of the invention which is not intended to limit the invention to the specific embodiment illustrated and described.

Referring now to the drawings, wherein like reference numerals indicate like parts throughout the several views, there is shown in FIG. 1 a fastener, generally identified by reference numeral 10, which embodies principals of the present invention. Fastener 10 includes a body 12 which defines an elongated axis 14 and includes a base 16 having a double tapered elongated portion 18 extending from one side or surface of base 16 and a locking or drive pin 20. In the illustrated embodiment, fastener 10 is arranged in operable combination with and serves to secure two members, such as panels or articles 22 and 24. More specifically, the elongated portion 18 of fastener 10 is insertable into and through aligned holes, apertures or slots 26 and 28 provided in panels 22 and 24, respectively, until side or surface 19 abuts one of the panels 22, 24.

Figure 2:
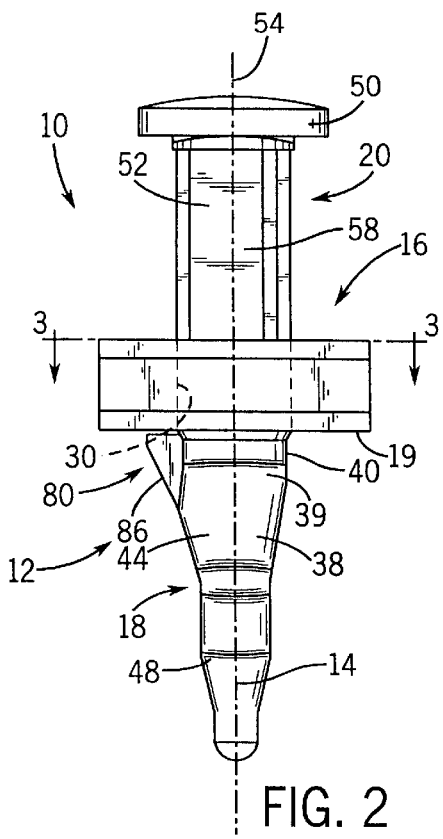
FIG. 2 is an enlarged side elevational view of the fastener illustrated in FIG. 1.
Figure 3:
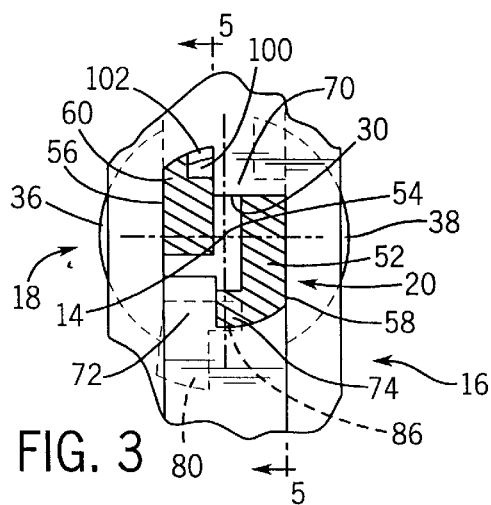
FIG. 3 is an enlarged partially sectional view taken along line 3—3 of FIG. 2.

The base 16 and elongated portion 18 of fastener body 12 are preferably integrally molded to each other. As shown in FIGS. 1 through 3, base 18 of fastener body 12 defines an aperture or opening 30 which opens at opposite end thereof and which accommodates and guides the drive pin 20 along a predetermined path of travel.

The elongated portion 18 of fastener body 12 has a closed tapered nose 32 to facilitate insertion of the elongated portion 18 of fastener body 12 into holes or openings 26, 28 in the panels 22, 24, respectively. At its widest point, the elongated portion 18 of fastener body 12 has a configuration which exceeds the size of the holes or openings 26, 28 in the panels 22, 24, respectively. The elongated portion 18 of fastener body 12 defines a blind slot or passage 34 arranged in general axial alignment with the aperture or opening 30 defined in the base 16 of the fastener body 12. Notably, the blind slot or passage 34 does not extend through the closed nose 32 of the elongated portion 18 of fastener body 12.

In the preferred embodiment, the elongated portion 18 of fastener body 12 includes two diametrically opposed flexible conjoined arms 36 and 38 which define the passage or slot 34 therebetween. Notably, and as illustrated in FIGS. 1 and 2, proximal ends 39 of the arms 36, 38, where they join to the base 16, define an outer surface 40 of a predetermined size. Preferably, the predetermined size of the outer surface 40 defined by the proximal ends of flexible arms 36, 38 is generally equal to the size of the openings 26, 28 in the panels 22, 24.

As illustrated in FIG. 1, the conjoined arms 36 and 38 define angled or tapered portions 42 and 44, respectively, which splay outwardly slightly from the axis 14. As will be appreciated, the combined or widest distance across the outer surfaces of the tapered portions 42, 44 is greater than the openings 26, 28 in the panels 22, 24. In the illustrated embodiment, the terminal ends of the outwardly tapered portions 42, 44 of the conjoined and flexible arms 36 and 38 are connected to inwardly tapered portions 46, 48, respectively, which slant toward axis 14 and are joined at the pointed nose or tip 32 of the elongated portion of fastener body 12.

Figure 4:
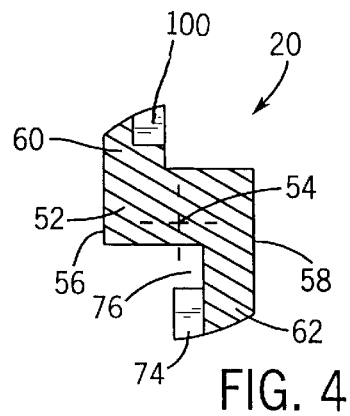
FIG. 4 is an enlarged sectional view taken along line 4—4 of FIG. 1.

The drive or locking pin 20 is arranged for movement relative to the fastener body 12 along a predetermined path of travel and within the aperture or opening 30 defined by the base 16 of fastener body 12 and within the passage 34 defined by the elongated portion 18 of the fastener body 12. In the illustrated embodiment, the drive pin 20 has a head portion 50 integrally molded to an elongated shank portion 52 defining an axis 54 which is generally aligned with the axis 14 of fastener body 12. As shown in FIGS. 3 and 4, and for a major portion of the length thereof, the cross-section of the shank portion 52 of drive pin 20 corresponds to the cross-section of the opening 30 in the base 16 of the fastener body 12. In the illustrated embodiment, the shank portion 52 of the drive pin 20 has a generally rectangular cross-section with laterally spaced, generally planar and parallel sides 56 and 58 disposed on opposed sides of axis 54.

Preferably, the shank portion 52 of locking pin 20 further defines alignment wings 60 and 62 extending in opposed directions relative to each other and away from axis 54 of pin 20. As illustrated in FIGS. 3 and 5, the base 16 of and the opening or aperture 30 defined by the fastener body 12 combine to provide mating surfaces 70 and 72 which serve to guide the alignment wings 60 and 62, respectively, and thereby the drive pin 20 along its predetermined path of travel as the drive pin 20 traverses between the predriven position, wherein a lengthwise portion of the drive pin 20 is inserted into the opening 30 in the fastener body 12 (FIGS. 1 and 2), and a driven position, wherein the a major lengthwise portion of the drive pin 20 is accommodated within the passage 34 defined by the elongated portion 18 of the fastener body 12 (FIGS. 9 and 10). As will be appreciated, the alignment wings 60, 62 on shank portion 52 of locking pin 20 and the mating surfaces 70, 72 on the fastener body base 16 also cooperate relative to each other to inhibit twisting or turning movements of the shank portion 52 of locking pin 20 and pin 20 moves between the predriven position and driven position.

As illustrated in FIGS. 1, 3 and 4, the shank portion 52 of drive pin 20 is provided, toward that end opposite from the head or cap portion 50, with an engagement member or projection 74 which linearly extends from that end of the shank portion 52 inserted into the opening 30 in the fastener body 12 and toward the head or cap portion 52 of the drive pin 20. Notably, an as illustrated in FIGS. 4 through 6, an open sided recess or channel 76 is provided between the engagement member or projection 74 and the axis 54 of the shank portion 52 of drive pin 20.

A salient feature of the present invention relates to the provision of a resilient or flexible lock 80 on the fastener body 12 for restricting the drive pin 20 from being overdriven (during predrive or in a shipping condition) until the fastener 10 is installed or inserted within the panels 22, 24. That is, prior to installation of the fastener 10 into operable association with the panels 22,24 (FIG. 1), at least a portion of the resilient lock 80 extends into the predetermined path of travel of the drive pin 20 thereby restricting movement of the drive pin 20 from the predriven position to the driven position.

The lock 80 for fastener 10 is preferably disposed between the flexible arms 36,38 of the elongated portion 18 of the fastener body 12. In the illustrated embodiment, lock 80 includes a free ended arm 82 which is connected toward one end to one of the flexible arms 36, 38 of the elongated portion 18 of the fastener body 12. Preferably, arm 82 has a cantilevered design wherein the arm 82 is flexibly connected toward one end to the elongated portion 18 of the fastener body 12 to allow for flexing movement of the free end of the arm 82 toward and away from axis 14 of the fastener body 12. Notably, the connection of arm 82 to the fastener body 18 is such that arm 82 has a natural tendency to automatically return or spring outwardly to the position illustrated in FIGS. 3, 5 and 6 after being inwardly deflected. From its connection location with the elongated portion 18, arm 82 extends toward the fastener body base 16.

As shown in FIGS. 3, 5 and 6, an engagement projection 84 arranged toward the free end of the arm 82 extends into the path of travel of the engagement projection 74 on the shank portion 52 of the drive pin 20 when the drive pin 20 is in a predriven condition or position and the elongated portion 18 of fastener 10 is not yet fully inserted through the openings 26, 28 and into operable association with the panels 22, 24. As such, the drive pin 20 in restricted from moving past the lock 80 from the predriven position to the driven position.

Another salient feature of the present invention relates to the provision of a lock 80 for restricting the drive pin 20 of the fastener 10 from being overdriven (during predrive or in a shipping condition), and wherein the lock 80 is automatically and timely removed from restricting movement of fastener drive pin 20 from the predriven condition in response to insertion of the elongated portion 18 of the fastener 10 being inserted into operable association with the panels 22, 24.

As shown in FIGS. 2, 5 and 6, the lock 80 is configured such that a portion thereof projects radially outward away from the axis 14 of the fastener body 12 and beyond the predetermined size of the outer surface 40 defined toward the proximal end of the flexible arms 34, 36 of the elongated portion 18 of the fastener body 12. In the illustrated embodiment, the lock arm 82 is configured with a camming surface 86 for automatically and timely removing the lock 80 from restricting the fastener drive pin 20 from moving from the predriven condition in response to insertion of the elongated portion 18 of the fastener 10 being inserted into operable association with the panels 22, 24. In the illustrated embodiment, the camming surface 86 extends along a lengthwise portion of the flexible arm 82 disposed for engagement with the openings 26, 28 in the panels 22, 24, respectively.

Turning to FIGS. 7 and 8, and as the elongated portion 18 of the fastener body 12 is inserted through the openings or holes 26, 28 in the panels 22, 24, respectively, the caming surface 86 on the lock arm 82 engages with the margin or edges of the openings or holes 26, 28 in the panels 22, 24, respectively, thus, causing the lock arm 82 to resiliently deflect. In the illustrated embodiment, and after the elongated portion 18 is operably inserted within the apertures or openings 26, 28 in the panels 22, 24, the arm 82 is resiliently deflected to such an extent that the free end of arm 82 is substantially within the predetermined size of the outer surface 40 of the flexible arms 36, 38 of the elongated portion 18 of the fastener body 12. As will be appreciated from an understanding of the present invention, the deflection of arm 82 effectively removes the lock 80 from the predetermined path of travel or movement of the drive pin 20.

With the illustrated embodiment, resilient deflection of the arm 82 effectively removes the engagement projection 84 on the lock 80 from the path of travel of the engagement projection 74 on the drive pin 20 and into operable alignment with the passage or channel 76 on the drive pin 20. As will be appreciated, after the engagement projection 84 on lock 80 is removed from the path of the travel of the engagement projection 74 on the drive pin 20 and into general alignment with the channel or passage 76, the locking relationship between drive pin 20 and lock 80 is operably released and the engagement projection 84 is permitted to traverse through channel 74 as drive pin 20 moves from the predriven position to the driven position.

In a preferred embodiment, the drive pin 20 is positively retained in the driven position by a stop 90. As illustrated in FIGS. 1, 9 and 10, stop 90 includes a projection 92 provided on the shank portion 52 of drive pin 20 in linearly spaced relation from the engagement projection 74 and in linearly spaced relation from that end of the drive pin 20 inserted into the aperture or opening 30 in the base 16 of the fastener body 12. As shown in FIG. 10, an open sided recess or channel 96 is provided between the projection 92 and the axis 54 of the drive pin shank portion 52 to allow for sliding movement of the free end or engagement projection 84 on the free end of locking arm 82 past stop 90 as the drive or locking pin 20 moves from the predriven position to the driven position.

As illustrated in FIGS. 9 and 10, after the drive or locking pin 20 is moved to the driven position, the lock 80 restricts movement of the stop 90 on the drive pin 20 therepast. More specifically, in the illustrated embodiment, the engagement projection 84 on the free end of the locking arm 82 is disposed to inhibit retracted movement of the stop 90 and, thus, the driving pin 20, from the driven position toward the predriven position thereby maintaining the fastener 10 in operable fastened engagement with the panels 22, 24.

As shown in FIG. 10, the projection 92 on the stop 90 is provided with a chamfered or cam surface 94 for promoting movement of the free end of the lock 80 therepast as the drive or locking pin 20 is moved from the predriven position to the driven position. As illustrated, the chamfer or cam surface 94 is provided along that edge of the projection 92 disposed closest to the free end of pin 20 and adjacent to the channel 96. As such, and as pin 20 moves from the predriven position toward the driven position, cam 94 engages the free end of the locking arm 82 thereby resiliently deflecting locking arm 82 toward and into the channel 96 to promote movement of the stop 90 and, thus, the pin 20 therepast.

As illustrated in FIG. 11, the free end of locking arm 82 is configured with a camming surface 98. As will be appreciated, the purpose of the camming surface 98 is to facilitate movement of the drive or locking pin 20 past the lock 80 when the lock 80 is released from engagement with the drive pin 20 and is moved between predriven and driven positions.

Preferably, fastener 10 is furthermore configured to inhibit the drive or locking pin 20 from dislodging from the fastener body 12 after the pin 20 is in a predriven condition or position. Returning to FIGS. 3 through 5, shank portion 52 of pin 20 is provided with a projection 100 linearly spaced from that end of the pin 20 which is insertable into the opening or aperture 30 in the base 16 of the fastener body 12. As shown in FIG. 3, projection 100 is preferably formed on a side of the alignment wing 60 opposite from side 56 of pin 20 and projects away from the axis 54 of the pin 20. As illustrated in FIGS. 3 and 5, a pin retention tab 102 is defined on the base 16 of the fastener body 12 for operable engagement with the projection 100 on the drive pin 20. The projection 100 and pin retention tab 102 define chamfered sections 104 and 106, respectively, for facilitating sliding linear movement of the drive or locking pin 20 toward a predriven position. As shown in FIG. 5, the projection 100 on the drive or locking pin 20 defines a surface 108 which is configured to engage and abut against a confronting surface 110 defined on the pin retention tab 102 in a manner resisting subsequent withdrawal of the locking or drive pin 20 from the predriven condition or position.

The fastener body 12 and drive pin 20 can be molded separately if so required by design constraints. Preferably, however, the fastener body 12 and drive pin 20 are integrally molded as one piece. If molded as one piece, and as schematically illustrated in FIG. 12, the fastener body 12 and drive pin 20 are interconnected by interstices, gates or other forms of a frangible portion 120. Preferably, the gates or interstices 120 connect that portion of the fastener body 12 arranged about the opening or aperture 30 in base 16 with a distal end of the drive pin 20. Preferably, the fastener body 12 and drive pin 20 are molded from plastic, but the particular material can vary.

To use fastener 10, the installer typically either receives fastener 10 in the predriven state or predrives fastener 10 by inserting the locking pin 20 into the aperture 30 of the fastener body 12 with sufficient effort so that the frangible portion 120 breaks and the drive pin 20 is moved to the predriven position where the lock 80 limits further movement of pin 20 toward a driven position. Moreover, and after pin 20 is moved to a predriven condition or state, the projection 100 on the shank portion 52 of pin 20 and the pin retention tab 102, defined on the fastener body base 16, combine to inhibit the drive or locking pin 20 from dislodging from the fastener body 12.

The installer then pushes the pointed nose 32 of the double tapered elongated portion 18 of fastener 10 through the openings, slots, or holes 26, 28 in the panels 22, 24, respectively. As long as the drive or locking pin 20 is in a predriven position, illustrated in FIGS. 1 and 2, the slot or passage 34 in the elongated portion 18 of fastener body 12 to deflect inward toward axis 14 thereby promoting insertion of the elongated portion 18 through the holes or slots 26, 28 in the panels 22, 24, respectively. As will be appreciated from an understanding of the present invention, and until the elongated portion 18 of fastener 10 is arranged in operable association with the panels 22, 24, the lock 80 maintains the drive or locking pin 20 in the predriven state or condition thereby promoting collapse of the elongated portion 18, thus, promoting insertion of the fastener 10 into operable association with the panels 22, 24.

Once the elongated portion 18 of fastener body 12 is inserted through the holes or slots 26, 28 and into operable relation with panels 22, 24, respectively, the lock 80 is automatically removed from restricting travel of the drive or locking pin 20 between the predriven and driven positions. Accordingly, the pin 20 is movable from the predriven position to the driven state or position, illustrated in FIGS. 9 and 10, whereby the pin 20 fills the passage 34 and inhibits the inward or collapsing movement of the elongated body 18 of the fastener 10. The cross-sections of the elongated body 18 and shank portion 52 of pin 20 are such that aq substantially solid member is formed when pin 20 is fully inserted into the fastener body 12. The arms 38 and 40 are thereby prevented from collapsing, thus, opposing extraction of the fastener 10 from the panels 22, 24. Afer being moved to the driven position, the stop 90 combines with the lock 80 to prevent the fastener 10 from vibrating loose.

As will be appreciated from above, the fastener 10 of the present invention has many applications. In addition to being used as a fastener as described above, it can be used in routing clips, brackets, hole plugs, and decorative or functional covers. The high retention force makes the apparatus of the present invention an ideal replacement for threaded covers.

From the foregoing it will be observed that numerous modifications and variations can be effected without departing or detracting from the spirit and scope of the novel concept of the present invention. It will be appreciated that the present disclosure is intended to set forth an exemplification of the present invention and is not intended to limit the invention to the specific embodiment illustrated and described. The disclosure is intended to cover by the appended claims all such modification and colorful variations as fall within the spirit and scope of the present invention.

What is claimed is:

1. A fastener comprising:
    a body including a base and flexible conjoined arms extending from said base, said body having an aperture defined by said base and a passage formed between said conjoined arms, said aperture and said passage being arranged in general alignment relative to each other, and wherein, at a proximal end thereof, said conjoined arms define an outer surface of a predetermined size;
    an elongated locking pin defining a longitudinal axis and arranged for movement relative to said body along a predetermined path of travel and within said aperture and said passage, said locking pin having a predriven position, wherein a lengthwise portion of said pin extends at least partially through said aperture, and a driven position, wherein a lengthwise portion of said pin extends through said aperture and into said passage between said conjoined arms to limit movement of said arms inwardly toward said axis; and
    a resilient lock provided on said body to project radially outward beyond the predetermined size of the outer surface of said conjoined arms and into the predetermined path of travel of said pin, when said locking pin is in said predriven position, thereby restricting movement of said locking pin toward said driven position until said lock is resiliently deflected within the predetermined size of the outer surface of said conjoined arms whereby said lock is removed from the path of travel of and permits said locking pin to move toward the driven position.

2. The fastener according to claim 1 wherein said conjoined arms comprise outwardly splayed portions extending away from said base and which define said passage therebetween, and inwardly extending portions which are joined at distal ends thereof.

3. The fastener according to claim 1 wherein said locking pin comprises a cap portion and a shank portion.

4. The fastener according to claim 1 wherein said locking pin includes a predrive retention protrusion extending from said pin and engagable with predrive retention structure on said base to retain said locking pin in said predriven position.

5. The fastener according to claim 1 wherein said lock provided on said body comprises a free ended arm which is connected at one end to one of said conjoined arms of said body and extends toward said base.

6. The fastener according to claim 1 wherein said locking pin includes a stop linearly spaced from that end of said locking pin inserted into said aperture, and wherein said lock is configured to engage with said stop on said locking pin, after said locking pin is moved to said driven position, to retain said locking pin in said driven position.

7. The fastener according to claim 1 wherein said lock comprises a free ended arm which is connected at one end to one of said conjoined arms of said body and extends toward said base, and wherein said pin defines a channel for accommodating the free ended arm to an extent allowing said locking pin to move past said lock and move to said driven position.

8. The fastener according to claim 7 wherein the free end of said arm is configured to promote movement of said locking pin therepast and toward said driven position after said resilient projection is deflected.

9. The fastener according to claim 1 wherein the aperture defined by said base and said locking pin have generally corresponding cross-sections whereby said locking pin is inhibited from twisting or rotating about said axis and relative to said body.

10. The fastener according to claim 1 wherein said body and said locking pin are initially formed as a single piece of molded plastic with interstices formed therebetween.

11. A plastic fastener adapted to be arranged in operable combination with a member defining an opening through which at least a portion of said fastener extends, said fastener comprising:
    a body having an apertured base and an elongated portion, said elongated portion being insertable into said opening in said member and having a plurality of flexible spaced arms projecting from said base and defining a passage therebetween, said passage being generally aligned with the aperture in said base, with an outer surface at a proximal end of each arm tapering outwardly from a longitudinal axis of said elongated portion whereby each arm is adapted to flex inwardly toward said longitudinal axis when the elongated portion of said body is inserted through the opening in said member, and with a distal end of said arms being joined at a nose tapering inwardly toward said longitudinal axis;
    a pin movable relative to said body along a predetermined path of travel and within said aperture and said passage, said pin having a predriven position, wherein a lengthwise portion of said pin extends at least partially through said aperture, and a driven position, wherein a lengthwise portion of said pin extends through said aperture and into said passage between said arms of said elongated portion to limit movement of said arms inwardly toward said longitudinal axis; and
    a flexible locking member carried by said body and which, when said pin is in said predriven position, extends into said passage and between the flexible spaced arms of the elongated portion of the fastener into the predetermined path of travel of said pin to restrict movement said pin toward said driven position until after said elongated portion of the fastener is moved through said opening.

12. The plastic fastener according to claim 11 wherein the outward taper of each arm terminates at a spaced distance from said longitudinal axis of said elongated portion and such that the spaced distances defined by two of said spaced arms is greater than the size of said opening through which said fastener extends.

13. The fastener according to claim 11 wherein said pin includes a predrive retention protrusion extending from said pin and engagable with predrive retention structure on said base to retain said pin in said predriven position.

14. The fastener according to claim 11 wherein said pin includes a stop linearly spaced from that end of said pin inserted into said aperture, and wherein said flexible locking member is configured to engage with said stop on said pin, after said pin is moved to said driven position, to retain said pin in said driven position.

15. The fastener according to claim 11 wherein said flexible locking member comprises a free ended arm which is connected at one end to one of said spaced arms of said body and extends toward said base, and wherein said pin defines a channel for accommodating the free end of said arm to an extent allowing said pin to move past said lock and move to said driven position.

16. The fastener according to claim 15 wherein the free end of said arm is configured to promote movement of said pin therepast and toward said driven position after said flexible lockig member is deflected.

17. The fastener according to claim 11 wherein the aperture defined by said base and said pin have generally corresponding cross-sections whereby said pin is inhibited from twisting or rotating about said axis and relative to said body.

18. The fastener according to claim 11 wherein said body and said pin are initially formed as a single piece of molded plastic with interstices formed therebetween.

19. A plastic fastener adapted to be arranged in operable combination with a member defining an opening through which at least a portion of said fastener extends, said fastener comprising:

a body having an apertured base and an elongated portion, said elongated portion being insertable into said opening in said member and having a plurality of flexible spaced arms projecting from said base and defining a passage therebetween, said passage being generally aligned with the aperture in said base, with each arm tapering outwardly from a longitudinal axis of said elongated portion, with a distal end of said arms being joined at a nose tapering inwardly toward said longitudinal axis;

a pin movable relative to said body along a predetermined path of travel and within said aperture and said passage, said pin having a predriven position, wherein a lengthwise portion of said pin extends at least partially through said aperture, and a driven position, wherein a lengthwise portion of said pin extends through said aperture and into said passage between said arms of said elongated portion to limit movement of said arms inwardly toward said longitudinal axis; and with said body including a flexible lock comprising an elongated free ended arm connected at one end to one of said spaced arms on the elongated portion of said body and extends toward said base and which, when said pin is in said predriven position, extends into the predetermined path of travel of said pin thereby restricting movement said pin toward said driven position until after said elongated portion of the fastener is moved through said opening.

* * * * *